United States Patent
Koga

(10) Patent No.: US 12,267,112 B2
(45) Date of Patent: Apr. 1, 2025

(54) COMMUNICATION APPARATUS, COMMUNICATION SYSTEM, COMMUNICATION METHOD, AND NON-TRANSITORY COMPUTER READABLE MEDIUM

(71) Applicant: NEC Corporation, Tokyo (JP)

(72) Inventor: Tadashi Koga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 144 days.

(21) Appl. No.: 18/020,193

(22) PCT Filed: Jun. 2, 2021

(86) PCT No.: PCT/JP2021/021060
§ 371 (c)(1),
(2) Date: Feb. 7, 2023

(87) PCT Pub. No.: WO2022/038859
PCT Pub. Date: Feb. 24, 2022

(65) Prior Publication Data
US 2023/0291481 A1   Sep. 14, 2023

(30) Foreign Application Priority Data
Aug. 19, 2020   (JP) .................... 2020-138482

(51) Int. Cl.
*H04B 10/54*   (2013.01)
*H04J 14/08*   (2006.01)
*H04L 27/34*   (2006.01)

(52) U.S. Cl.
CPC ............ *H04B 10/541* (2013.01); *H04J 14/08* (2013.01); *H04L 27/34* (2013.01)

(58) Field of Classification Search
CPC ..... H04B 10/541; H04B 10/516; H04J 14/08; H04J 3/00; H04L 27/34; H04L 1/0003;
(Continued)

(56) References Cited

U.S. PATENT DOCUMENTS 9,191,145 B2 * 11/2015 Ogiwara .......... H04B 10/07957
10,873,930 B2 * 12/2020 Stanwood .......... H04B 7/15557
(Continued)

FOREIGN PATENT DOCUMENTS

EP     2506477 A2     10/2012
EP     2930866 A1 *   10/2015   ........... H04B 10/516
(Continued)

OTHER PUBLICATIONS

International Search Report for PCT Application No. PCT/JP2021/021060, mailed on Aug. 17, 2021.

*Primary Examiner* — Abbas H Alagheband
(74) *Attorney, Agent, or Firm* — Sughrue Mion, PLLC

(57) ABSTRACT

A communication apparatus, a communication system, a communication method, and a non-transitory computer readable medium capable of reducing differences among receiving characteristics of a plurality of quadrature amplitude-modulated signals and optimizing the capacity of transmission signals are provided. A communication apparatus (1) according to the present disclosure includes a transmitting unit (2) capable of transmitting a plurality of types of quadrature amplitude-modulated signals, and an addition unit (3) that adds error correction codes to the quadrature amplitude-modulated signals. Further, the communication apparatus (1) includes a control unit (4) that changes the number of bits of the error correction code according to the type of the quadrature amplitude-modulated signal.

8 Claims, 12 Drawing Sheets

(58) Field of Classification Search
CPC ... H04L 1/0009; H04L 27/186; H04L 27/362; H04L 27/3818; H04L 27/3405; H04L 27/2096; H04L 27/223
USPC .......................................................... 398/98
See application file for complete search history.

(56) References Cited

U.S. PATENT DOCUMENTS

2002/0119783 A1\* 8/2002 Bourlas ................. H04W 72/52
455/452.2
2019/0334558 A1\* 10/2019 Razzetti ................ H04L 1/0057

FOREIGN PATENT DOCUMENTS

| JP | 2000-151516 | A |   | 5/2000 |
|----|-------------|---|---|--------|
| JP | 2000261511  | A | \* | 9/2000 |
| JP | 2011-015290 | A |   | 1/2011 |
| JP | 2016171363  | A | \* | 9/2016 |
| JP | 2018011185  | A | \* | 1/2018 |

\* cited by examiner

COMMUNICATION APPARATUS, COMMUNICATION SYSTEM, COMMUNICATION METHOD, AND NON-TRANSITORY COMPUTER READABLE MEDIUM

This application is a National Stage Entry of PCT/JP2021/021060 filed on Jun. 2, 2021, which claims priority from Japanese Patent Application 2020-138482 filed on Aug. 19, 2020, the contents of all of which are incorporated herein by reference, in their entirety.

TECHNICAL FIELD

The present disclosure relates to a communication apparatus, a communication system, a communication method, and a non-transitory computer readable medium.

BACKGROUND ART

In recent years, communication services such as searches and video viewing (i.e., video streaming) through PCs and smartphones have spread worldwide. Therefore, there is a demand for advancement of the ultrafast communication technology that will support increases in capacities and sophistication of core communication systems. In the ultrafast communication technology using optical-fiber communication, a scheme in which an optical phase modulation (Phase Shift Keying) scheme, which have excellent transmission characteristics required for long-distance optical fiber transmission, a coherent receiving detection scheme (Coherent Detection), and a digital signal processing (DSP: Digital Signal Processing) technology are combined has begun to enter the mainstream.

As the phase modulation scheme, a binary phase modulation scheme (BPSK: Binary Phase Shift Keying) and a quaternary phase modulation scheme (QPSK: Quadrature Phase Shift Keying) are used because of, in particular, the balance between the transmission characteristics and the easiness and the cost for the implementation, and a quadrature amplitude modulation (QAM: Quadrature Amplitude Modulation) scheme, of which the optical frequency utilization efficiency is excellent, is also used in order to increase the transmission capacity without increasing the used optical frequency bandwidth. Further, research and development of M-ary QAM (M-ary Quadrature Amplitude Modulation) (m-QAM) schemes, such as 16QAM and 64QAM using driving amplitude signals having multi-value levels of 16 and 64, respectively, have been increasingly conducted. Patent Literature 1 discloses a technology related to an optical transmission system that transmits quadrature amplitude-modulated signals by a frequency-division multiplexing scheme.

CITATION LIST

Patent Literature

Patent Literature 1: Japanese Unexamined Patent Application Publication No. 2000-151516

SUMMARY OF INVENTION

Technical Problem

In the technology disclosed in Patent Literature 1, since quadrature amplitude-modulated signals are transmitted by the frequency-division multiplexing scheme, it is possible to construct an optical transmission system having a high transmission speed (or a high transmission rate). However, in the related technology, receiving characteristics of a plurality of types of quadrature amplitude-modulated signals having different multi-value levels differ from each other. Further, when error correction codes (FEC: Forward Error Correction) are used according to the multi-value level of the modulated signal, the number of error correction bits to be added changes according thereto. Therefore, there is a problem that the performance design of the optical transmission system becomes complicated.

The present disclosure has been made in order to solve the above-described problem, and an object thereof is to provide a communication apparatus, a communication system, a communication method, and a non-transitory computer readable medium capable of reducing differences among receiving characteristics of a plurality of quadrature amplitude-modulated signals, and optimizing the capacity (or the volume) of transmission signals.

Solution to Problem

A communication apparatus according to the present disclosure includes: a transmitting unit capable of transmitting a plurality of types of quadrature amplitude-modulated signals; an addition unit configured to add error correction codes to the quadrature amplitude-modulated signals; and a control unit configured to change the number of bits of the error correction code according to the type of the quadrature amplitude-modulated signal.

A communication system according to the present disclosure includes: a transmitter capable of transmitting a plurality of types of quadrature amplitude-modulated signals and adding error correction codes to the quadrature amplitude-modulated signals; a receiver configured to demodulate the received quadrature amplitude-modulated signals; and a controller including means for changing, for each of the quadrature amplitude-modulated signals to be transmitted, the number of bits of the error correction code to be added thereto.

A communication method according to the present disclosure includes: means for adding an error correction code to a quadrature amplitude-modulated signal; means for changing the number of bits of the error correction code according to a type of the quadrature amplitude-modulated signal; and means for transmitting a plurality of types of quadrature amplitude-modulated signals.

A non-transitory computer readable medium according to the present disclosure stores a communication program for causing an information processing apparatus to perform: a process for adding an error correction code to a quadrature amplitude-modulated signal; a process for changing the number of bits of the error correction code according to a type of the quadrature amplitude-modulated signal; and a process for transmitting a plurality of types of quadrature amplitude-modulated signals.

Advantageous Effects of Invention

According to the present disclosure, it is possible to provide a communication apparatus, a communication system, a communication method, and a non-transitory computer readable medium capable of reducing differences among receiving characteristics of a plurality of quadrature amplitude-modulated signals and optimizing the capacity (or the volume) of transmission signals.

EXAMPLE EMBODIMENT

Figure 1:
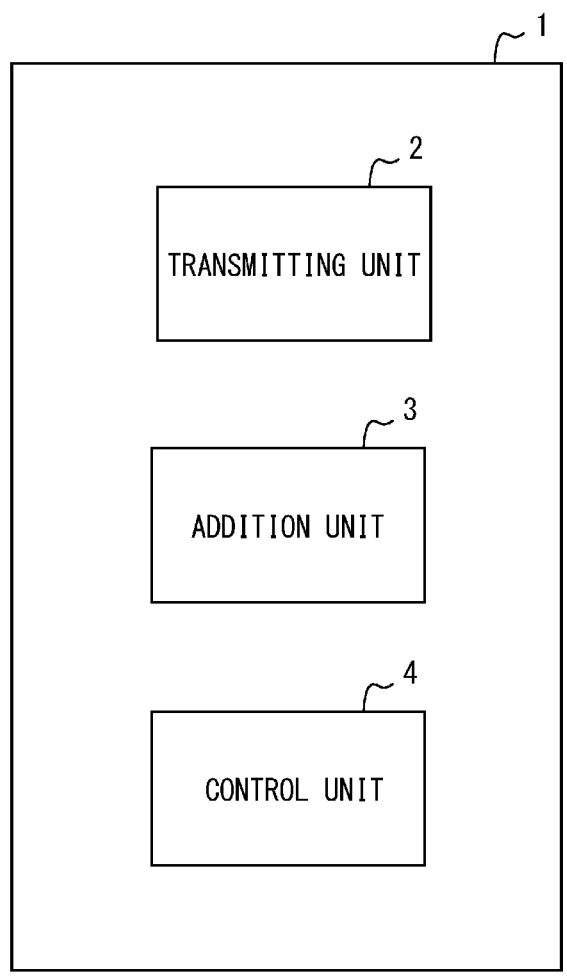
FIG. 1 is a block diagram of a communication apparatus according to a first example embodiment of the present disclosure.

An example embodiment will be described hereinafter with reference to the drawings. Note that since the drawings are simplified, the technical scope of the example embodiment should not be interpreted narrowly based on the drawings. Further, the same reference numerals (symbols) are assigned to the same components/structure, and redundant descriptions thereof are omitted.

In the following example embodiments, when necessary, the present invention is explained by using separate sections or separate example embodiments. However, those example embodiments are not unrelated with each other, unless otherwise specified. That is, they are related in such a manner that one example embodiment is a modified example, an application example, a detailed example, or a supplementary example of a part or the whole of another example embodiment. Further, in the following example embodiments, when the number of elements or the like (including numbers, values, quantities, ranges, and the like) is mentioned, the number is not limited to that specific number except for cases where the number is explicitly specified or the number is obviously limited to a specific number based on its principle. That is, a larger number or a smaller number than the specific number may be also used.

Further, in the following example embodiments, their components (including operation steps and the like) are not necessarily indispensable except for cases where the component is explicitly specified or the component is obviously indispensable based on its principle. Similarly, in the following example embodiments, when a shape, a position relation, or the like of a component(s) or the like is mentioned, shapes or the likes that are substantially similar to or resemble that shape are also included in that shape except for cases where it is explicitly specified or eliminated based on its principle. This is also true for the above-described numbers or the like (including numbers, values, quantities, ranges, and the like).

<Examination of Related Art>

When a communication system according to related art transmits/receives optical signals that have been modulated by adopting an M-ary QAM (M-ary Quadrature Amplitude Modulation) scheme (hereafter also referred to an "m-QAM") such as QPSK, 8QAM or 16QAM, in some cases, optical signals that have been modulated by a plurality of different types of M-ary QAM schemes are transmitted/received in a mixed manner. In such cases, receiving characteristics of modulated signals, such as the optical signal-to-noise ratio characteristic and the lowest light receiving sensitivity, may significantly change according to their multi-value levels.

Further, the receiving characteristics also change according to how quadrature amplitude-modulated signals having different multi-value levels are arranged on the time axis and are transmitted. Therefore, there is a problem that the performance design of the transmission system becomes complicated.

Further, the higher the multi-value level of a modulated signal is, the more the receiving characteristic of the modulated signal deteriorates. Therefore, it is necessary, for example, to apply error correction codes (e.g., the FEC) having higher performance in order to compensate for the deterioration amount. In that case, the bit rate of the transmission signal increases due to the increase in the number of error correction bits in the FEC caused by the enhancement of the correction capability. Therefore, high-speed optical and electrical devices used in the communication apparatus need to have excessively high-frequency performance, causing another problem that it is difficult to achieve stable manufacturing and the prices of manufactured devices rise.

In order to solve the above-described problems, an object of the present disclosure is, when a plurality of types of quadrature amplitude modulation schemes having different multi-value levels are used in a mixed manner, to reduce differences among receiving characteristics of a plurality of quadrature amplitude-modulated signals and optimize the capacity (or the volume) of transmission signals.

First Example Embodiment

A communication apparatus 1 according to this example embodiment transmits a signal to which an error correction code used for an error correction is added to each of a plurality of types of quadrature amplitude-modulated signals to be transmitted. The communication apparatus 1 includes a transmitting unit 2, an addition unit 3, and a control unit 4. The communication apparatus 1 is used to transmit/receive radio signals and optical signals.

The transmitting unit 2 can transmit a plurality of types of quadrature amplitude-modulated signals. The transmitting unit 2 transmits radio signals and optical signals.

The addition unit 3 adds error correction codes to the quadrature amplitude-modulated signals to be transmitted. For the error correction, an error correction scheme such as the FEC is used. However, the error correction is not limited to this example, and various methods such as the Hamming code and the parity code may be used.

The control unit 4 changes the number of bits of the error correction code according to the type of the quadrature amplitude-modulated signal to be transmitted. Further, the control unit 4 may change the amplitude of each quadrature amplitude-modulated signal to be transmitted.

According to the communication apparatus 1 in accordance with this example embodiment, it is possible to reduce differences among receiving characteristics of a plurality of quadrature amplitude-modulated signals and optimize the capacity of transmission signals.

Second Example Embodiment

Figure 2:
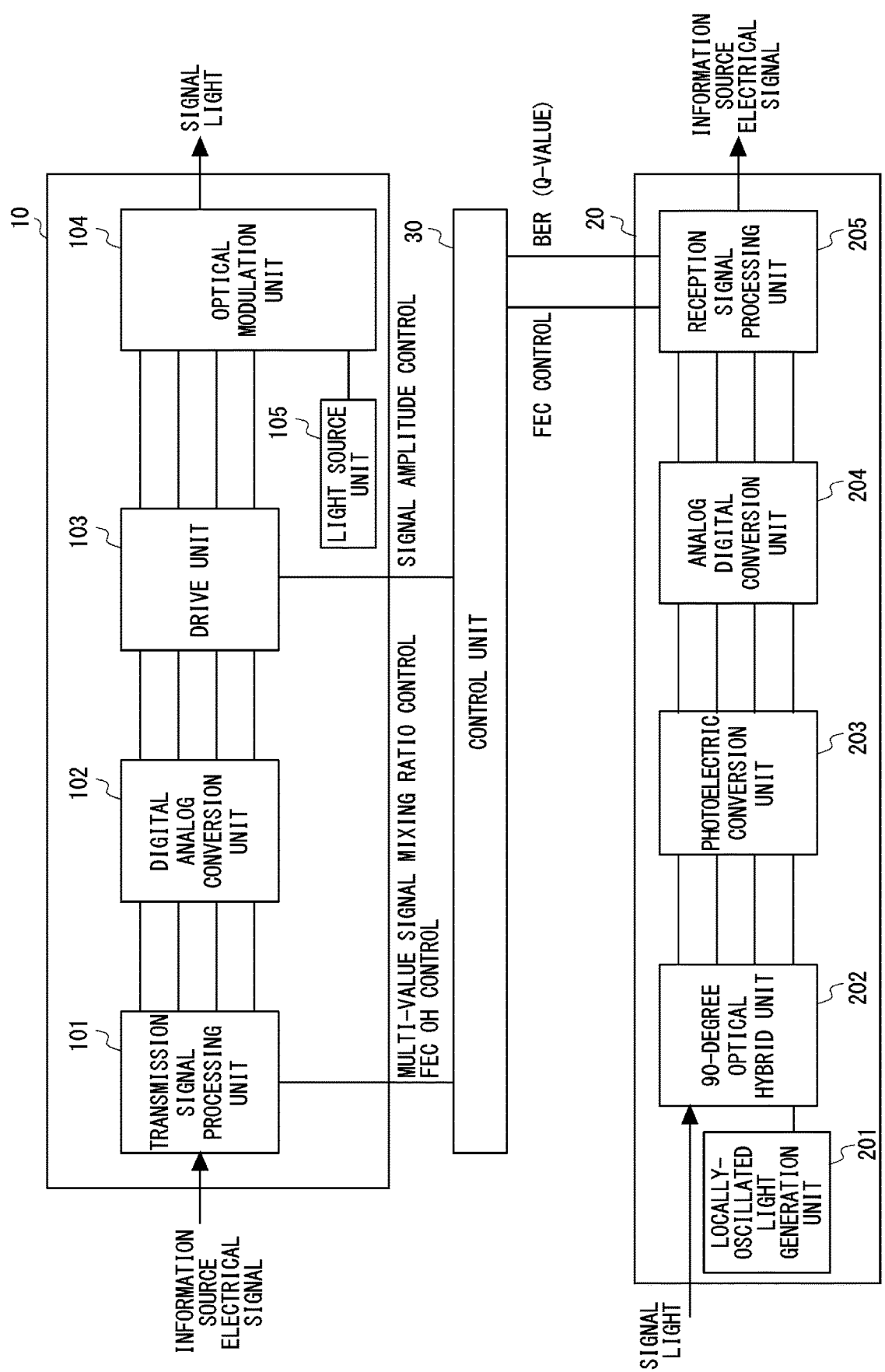
FIG. 2 is a block diagram of a communication apparatus according to a second example embodiment of the present disclosure.

A communication apparatus 1 according to this example embodiment is used to transmit/receive optical signals, and communication is performed by an M-ary QAM scheme. FIG. 2 shows a configuration of the communication apparatus 1 according to this example embodiment.

The communication apparatus 1 according to this example embodiment includes a transmitting unit 10, a receiving unit 20, and a control unit 30. Note that, for the optical transmission path, single-mode optical fibers are typically used, but various optical cables such as dispersion-shifted optical fibers may be used.

The transmitting unit 10 includes a transmission signal processing unit (DSP) 101, digital analog conversion unit (DAC: Digital Analog Converter) 102, a drive unit 103, a light source unit 105, and an optical modulation unit 104. The transmitting unit 10 converts an electrical signal, which is an information source, into an optical signal containing optical phase information and amplitude information.

The transmission signal processing unit 101 converts the informational electrical signal into a quadrature amplitude-modulated signal for polarization multiplexing multi-value phase modulation (Phase Shift Keying). Further, the transmission signal processing unit 101 performs a process for adding an error correction code to the converted quadrature amplitude-modulated signal. In this example embodiment, an FEC coding scheme is used as the above-described scheme for adding an error correction code.

The digital analog conversion unit 102 converts the electrical signal output from the transmission signal processing unit 101 from the digital value to an analog value. The converted analog signal is output to the drive unit 103.

The drive unit 103 receives the analog signal output from the digital analog conversion unit 102. The drive unit 103 amplitude-modulates the received analog signal and outputs the amplitude-modulated analog signal to the optical modulation unit 104.

The optical modulation unit 104 performs polarization multiplexing quadrature phase amplitude modulation on continuous oscillated light (CW light: Continuous Wave light) emitted from the light source unit 105. The optical modulation unit 104 uses various dielectrics or semiconductors such as lithium niobate (LiNbO3), Silicon Photonics, indium phosphate (InP), or polymer-based electrooptic materials. Further, the optical modulation unit 104 may use an optical apparatus such as a Mach-Zehnder interferometer.

The light source unit 105 generates CW light. For the light source unit 105, a CW laser that continuously oscillates (i.e., emits) a constant output is typically used. The light source unit 105 may use a semiconductor laser of which the medium is a semiconductor. However, the light source unit 105 is not limited to this example, and various light sources such as a solid-state laser and a gas laser may be used therefor.

The receiving unit 20 demodulates the received quadrature amplitude-modulated signal. The receiving unit 20 includes a locally-oscillated light generation unit (LO: Local Oscillator) 201, a 90-degree optical hybrid unit 202, a photoelectric conversion unit 203, an analog digital conversion unit (ADC: Analog Digital Converter) 204, and a reception signal processing unit 205.

The locally-oscillated light generation unit 201 is used for the coherent detection of an optical signal that has been received after being transmitted through the optical transmission path. The locally-oscillated light generation unit 201 preferably oscillates (i.e., emits) an optical signal having a frequency slightly different from that of the signal light in order to perform the coherent detection. The locally-oscillated light generation unit 201 may use a semiconductor laser of which medium is a semiconductor. However, the locally-oscillated light generation unit 201 is not limited to this example, and various light sources such as a solid-state laser and a gas laser may be used therefor.

The received optical signal and the locally-oscillated light emitted from the locally-oscillated light generation unit 201 are input to the 90-degree optical hybrid unit 202. The 90-degree optical hybrid unit 202 generates two signals whose phases differ from each other by 90 degrees based on the received optical signal and the locally-oscillated light. That is, the 90-degree optical hybrid unit 202 coherently receives the received optical signal, separates the coherently-received optical signal into In-phase signal light and Quadrature-phase signal light, and outputs the separated lights to the photoelectric conversion unit 203.

The photoelectric conversion unit 203 converts the optical signal received from the 90-degree optical hybrid unit 202 into an electrical signal. The converted electrical signal is output to the analog digital conversion unit 204. For the receiving unit 203, various photoelectric conversion elements such as a photodiode may be used.

The analog digital conversion unit 204 converts the electrical signal, which has been converted from the analog signal by the photoelectric conversion unit 203, into a digital signal. The converted digital signal is output to the reception signal processing unit 205.

The reception signal processing unit 205 performs a process for decoding the received digital signal by the FEC (Forward Error Correction). Further, the reception signal processing unit 205 performs a process for decoding the received digital signal into an electrical signal representing information from information source which is a signal of Quadrature Phase Shift Keying.

The control unit 30 performs a time-division multiplexing process on a plurality of types of quadrature amplitude-modulated signals. The control unit controls the allocation of quadrature amplitude-modulated signals on the time axis according to their type, the amount of the overhead (OH: Over Head) in which the error correction code of the FEC are stored, and the driving amplitude of the optical modulation unit 104. The control unit 30 controls the amount of the OH for the correction code of the FEC in the transmission signal processing unit 101 and in the reception signal processing unit 205. The control unit 30 controls the amplitude of the signal by controlling the intensity of the light output from the drive unit 103. Further, the control unit 30 monitors the bit error rate (BER: Bit Error Rate) calculated from the error correction number, and monitors the Q-value as transmission quality.

Operation Example of Communication Apparatus 1 According to Example Embodiment

Figure 3:
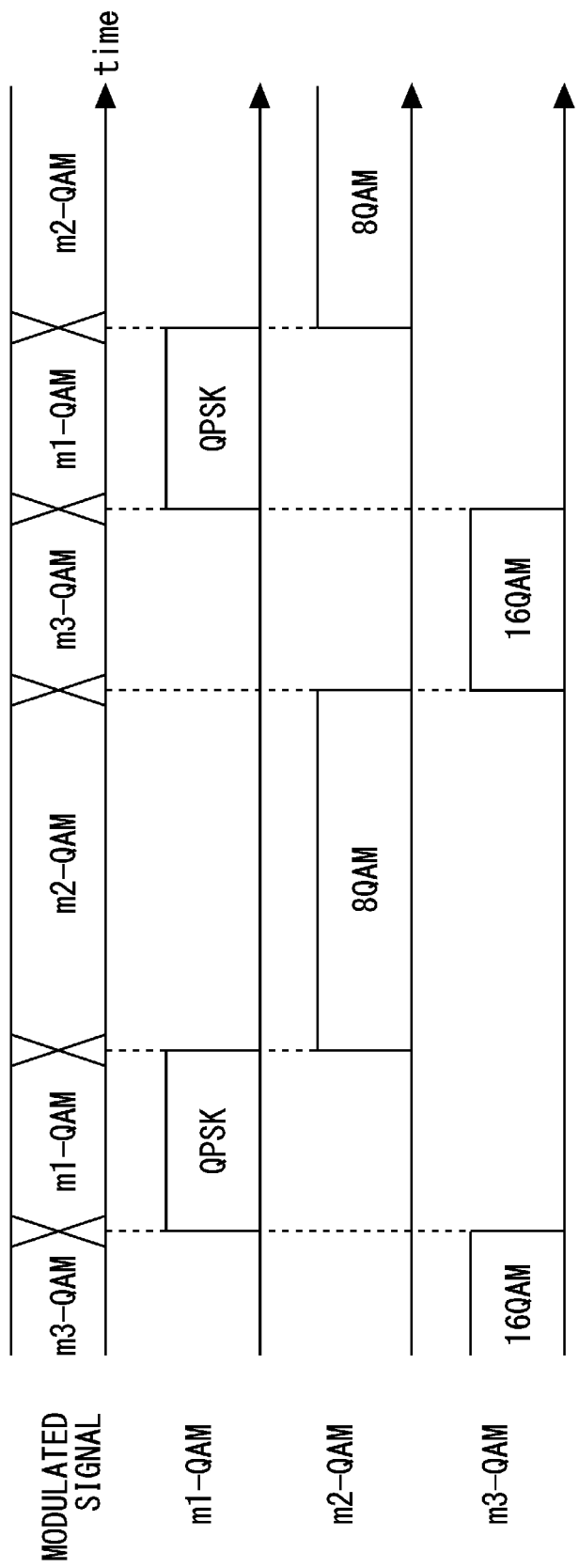
FIG. 3 is a timing chart showing an example of a transmitting operation performed by a communication apparatus according to related art.
Figure 4:
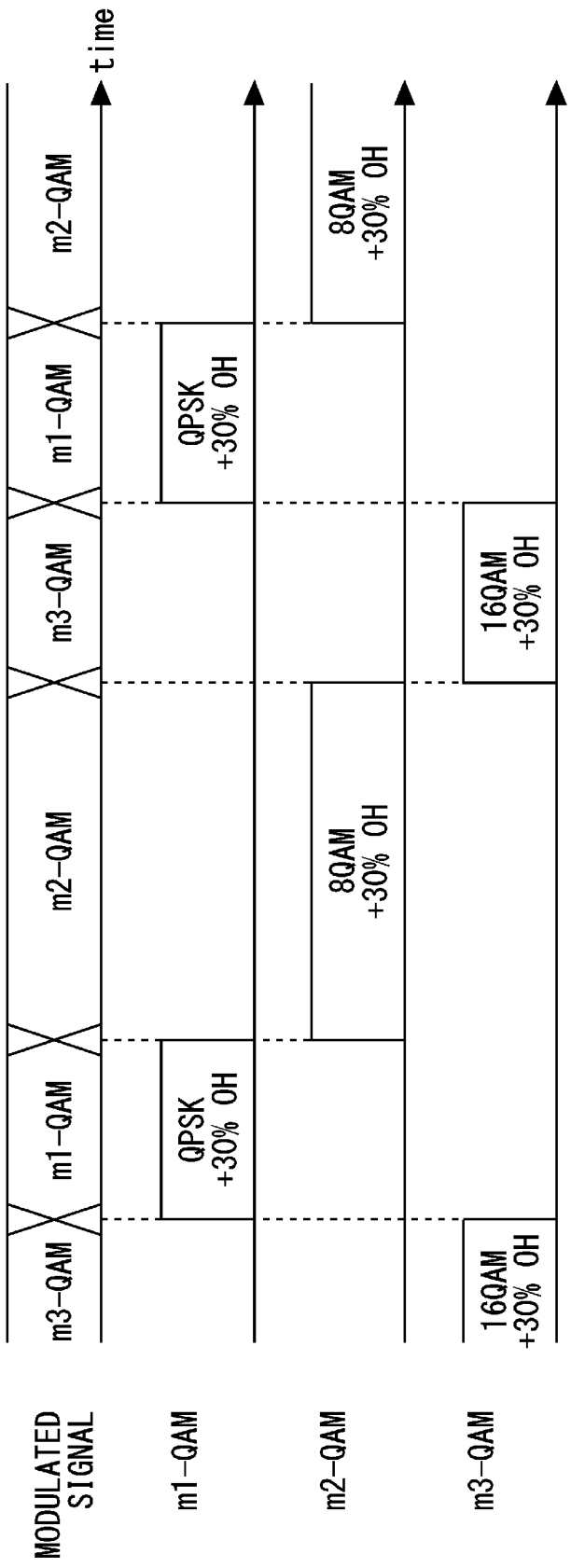
FIG. 4 is a timing chart showing an example of a transmitting operation performed by a communication apparatus according to related art.
Figure 5:
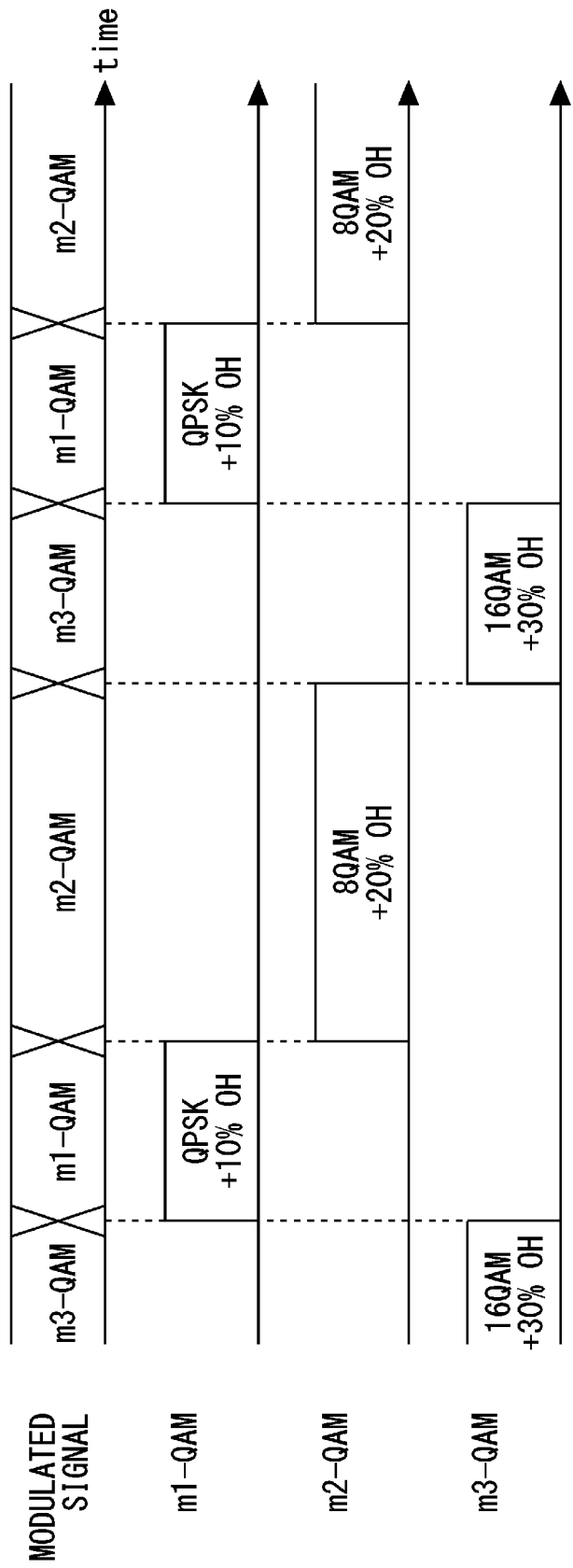
FIG. 5 is a timing chart showing an example of a transmitting operation performed by a communication apparatus according to the second example embodiment of the present disclosure.

An example of operations performed by the communication apparatus 1 according to this example embodiment will be described with reference to FIGS. 3 to 5. FIGS. 3 to 5 are timing charts showing an example of a transmission operation performed by the communication apparatus 1. In this example embodiment, a plurality of types of M-ary QAM (Quadrature Amplitude Modulation) signals (m-QAM signals) that drive an optical modulator are time-division multiplexed.

In this example embodiment, three types of quadrature amplitude-modulated signals (m-QAM signals) are transmitted. As shown in FIGS. 3 to 6, m1-QAM is QPSK (m1=4); m2-QAM is 8QAM (m2=8); and m3-QAM is 16QAM (m3=16). Each of them indicates a modulated optical signal.

Figure 7:
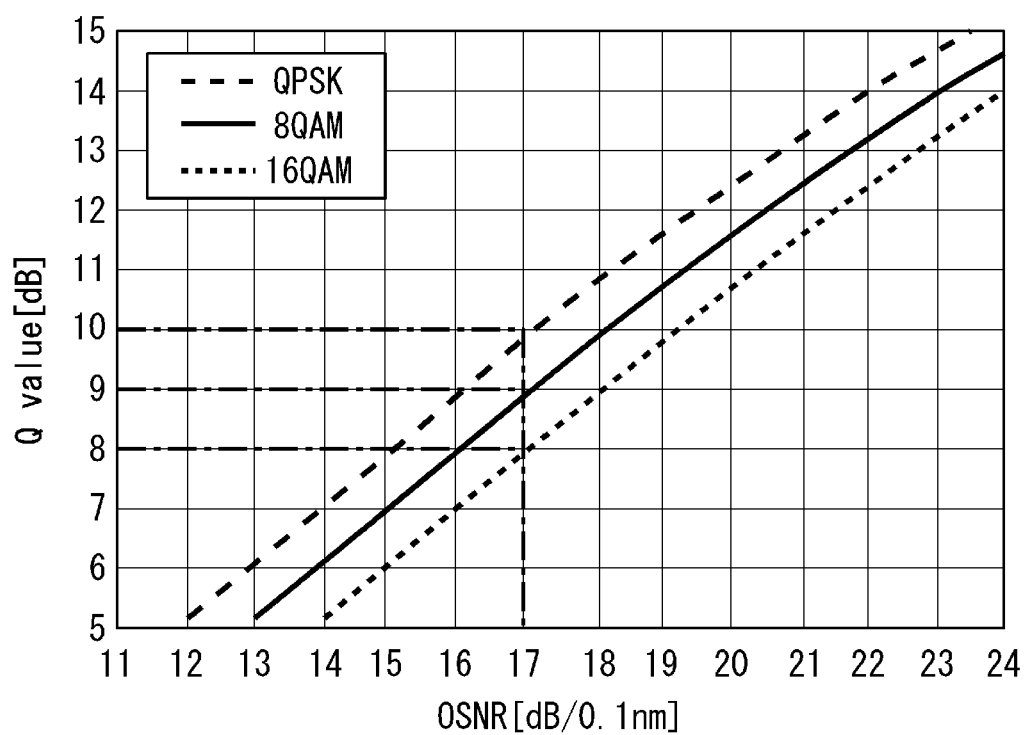
FIG. 7 is a graph showing signal receiving characteristics in the related art.

The control unit 30 determines the allocation of three types of quadrature amplitude-modulated signals (m-QAM signals) on the time axis according to their types, and controls the transmission signal processing unit 101 based on the determined allocation. Note that the problem that occurs when three types of quadrature amplitude-modulated signals (m-QAM signals) are transmitted is that, as shown in FIG. 7, the characteristics of the Q-values of the reception signals for the respective quadrature amplitude-modulated signals differ from one another under the same reception OSNR condition. FIG. 7 shows examples of the OSNR and the characteristics of Q-values for QPSK, 8QAM, and 16QAM, respectively. For example, when the reception OSNR is 17 (dB/0.1 nm), the reception Q-value of the QPSK signal is 10 dB; the reception Q-value of the 8QAM signal is 9 dB; and the reception Q-value of the 16QAM signal is 8 dB. That is, the receiving characteristics of their quadrature amplitude-modulated signals differ from each other.

Here, it is assumed that the apparatus is designed so that, as the transmission performance, the bit error rate (BER) characteristic is adjusted to 1×10^−12 or smaller (in terms of the Q-value, Q≥17 dB). As shown in FIG. 7, the reception Q-values of the QPSK signal, the 8QAM signal, and the 16QAM signal are 10 dB, 9 dB, and 8 dB, respectively, so they do not satisfy the required performance expressed as "Q≥17 dB". Therefore, it is necessary to correct bit errors by using the FEC and thereby to improve the performance in regard to the reception Q-value.

Note that regarding the FEC collection limit (FEC limit), which is the maximum value of the bit error rate before FEC coding that satisfies the requirement Q≥17 dB after the FEC coding, different limit performances can be selected by changing the type of the FEC coding scheme and/or the number of bits of the error correction code.

Figure 8:
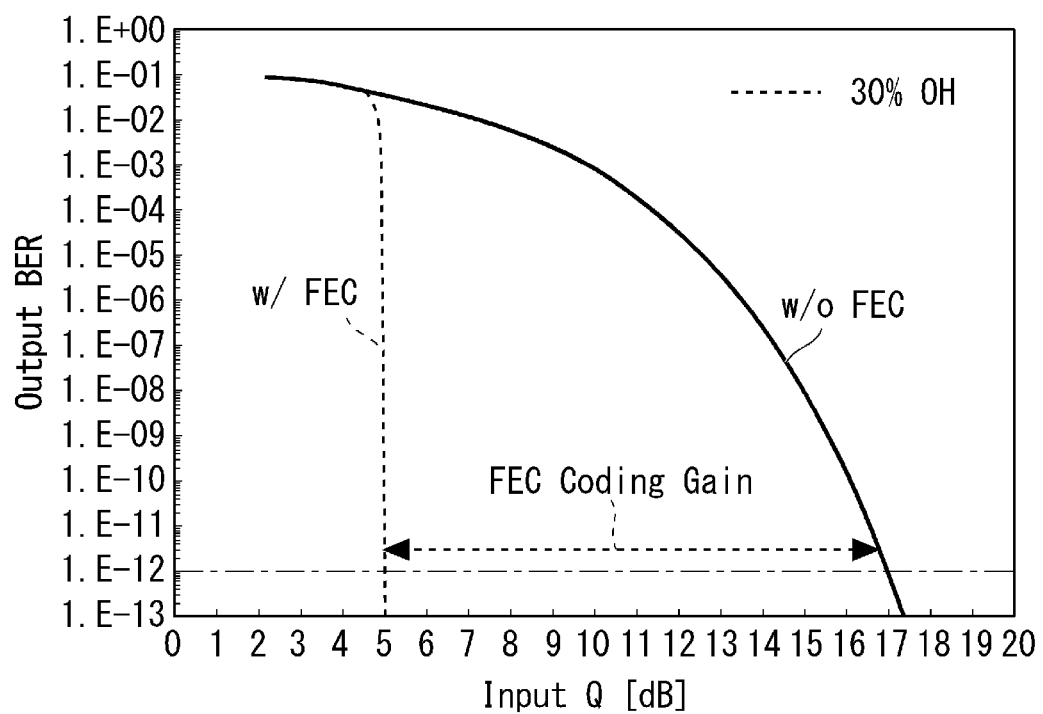
FIG. 8 is a graph showing signal receiving characteristics in the related art.

FIG. 8 shows an example of the FEC correction capability, in the case where the low density parity check code (LDPC: Low Density Parity Check code) scheme is used as the FEC coding scheme, when the amount of OH bytes of the correction code is 30%. In this scheme, since the FEC Limit is Q=5 dB, it is a value 3 dB higher than the FEC Limit value even under the condition that the reception Q value of the 16QAM signal is 8 dB. This value corresponds to a margin in regard to the performance of the transmission system.

Figure 9:
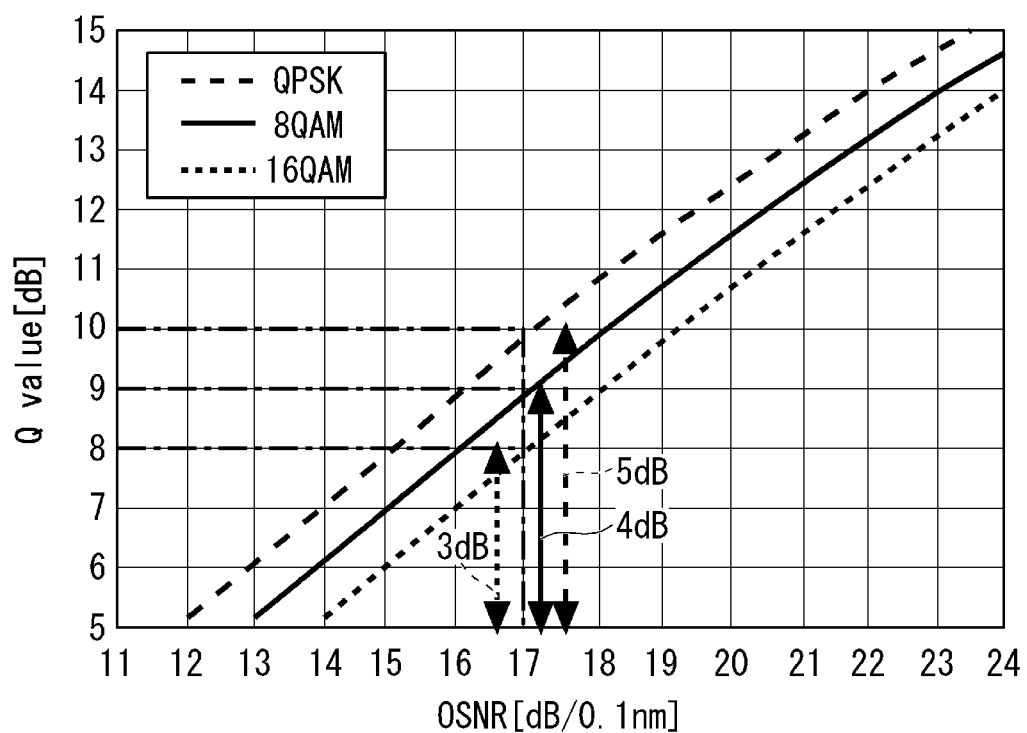
FIG. 9 is a graph showing signal receiving characteristics in the related art.

However, under this condition, as shown in FIG. 9, the reception Q-value of the QPSK signal is 10 dB and the reception Q-value of the 8QAM signal is 9 dB. Therefore, when the FEC in which the amount of OH bytes of the correction code is 30% is applied, their modulated signals has a margin of 4 dB from the FEC Limit value Q of 5 dB in the case of the 8QAM signal, and a margin of 5 dB in the case of the QPSK signal, respectively, so that the apparatus has transmission performance that is excessive over the margin of 3 dB for the 16QAM signal.

In the performance design of a transmission system in the above-described case, since it is necessary to design the performance so as to conform to the scheme in which the characteristic is the lowest, the system will be designed so that the base performance is 3 dB which is the margin when the reception Q-value of 16QAM signals is 8 dB and Q Limit is 5 dB in the state in which the amount of OH bytes of the correction code is 30%. However, in this case, it is impossible to make full use of the transmission performances for QPSK signals and 8QAM signals. As shown in FIG. 4, the FEC that requires the OH of 30% is also used for QPSK signals and 8QAM signal. As a result, the transmission bit rate unnecessarily rises by an amount equivalent to the amount of OH bytes of the correction code, and hence the operating speed of the communication apparatus 1 increases.

Therefore, as first means for making the transmission performances of various modulation schemes substantially equal to each other, for each of the modulation schemes, the correction capability of the used FEC is optimized according to the receiving characteristic of the respective quadrature amplitude-modulated signal. By doing so, it is possible to make the margins in regard to the transmission performances of the various modulation schemes substantially equal to each other, and to prevent or reduce the excessive rise in the transmission bit rate which would otherwise be caused by the addition of excessive FEC correction codes.

Figure 10:
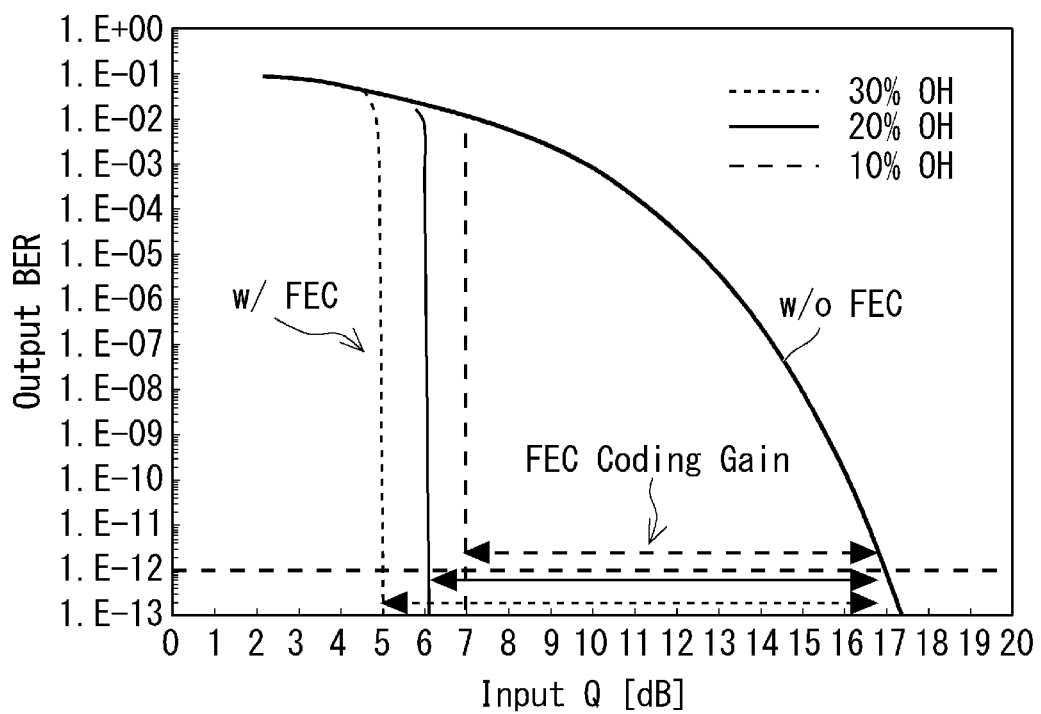
FIG. 10 is a graph showing signal receiving characteristics according to the second example embodiment of the present disclosure.
Figure 11:
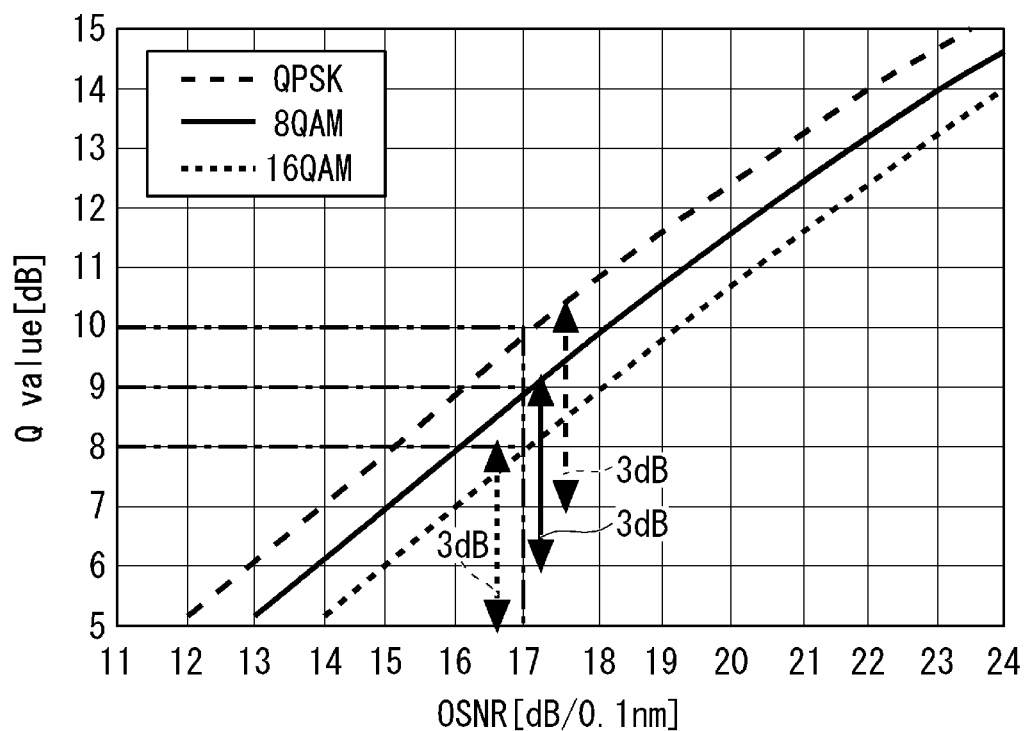
FIG. 11 is a graph showing signal receiving characteristics according to the second example embodiment of the present disclosure.

FIG. 10 shows examples of error correction characteristics in LDPC coding when the amounts of OH bytes of the correction codes are 10%, 20% and 30%, respectively. When the amount of OH bytes of the correction code is 10%, the FEC Limit value becomes 7 dB. When the amount of OH bytes of the correction code is 20%, the FEC Limit value becomes 6 dB. When the amount of OH bytes of the correction code is 30%, the FEC Limit value becomes 5 dB. FIG. 5 shows time charts when these three types in regard to the amount of OH bytes are applied to QPSK signals, 8QAM signals, and 16QAM signals, respectively, and FIG. 11 show their respective OSNR characteristics. As shown in FIG. 11, it can be understood that the margins in regard to the performance for QPSK signals, 8QAM signals, and 16QAM signals in a range from the reception Q-value at OSNR=17 (dB/0.1 nm) to the FEC Limit value are substantially equal to each other and are all 3 dB.

According to the communication apparatus 1 in accordance with this example embodiment, when a plurality of types of quadrature amplitude-modulated signals, which have been time-division multiplexed, are transmitted, it is possible to make the transmission performances of these modulation schemes substantially equal to each other without excessively increasing the amount of correction codes.

Third Example Embodiment

Figure 6:
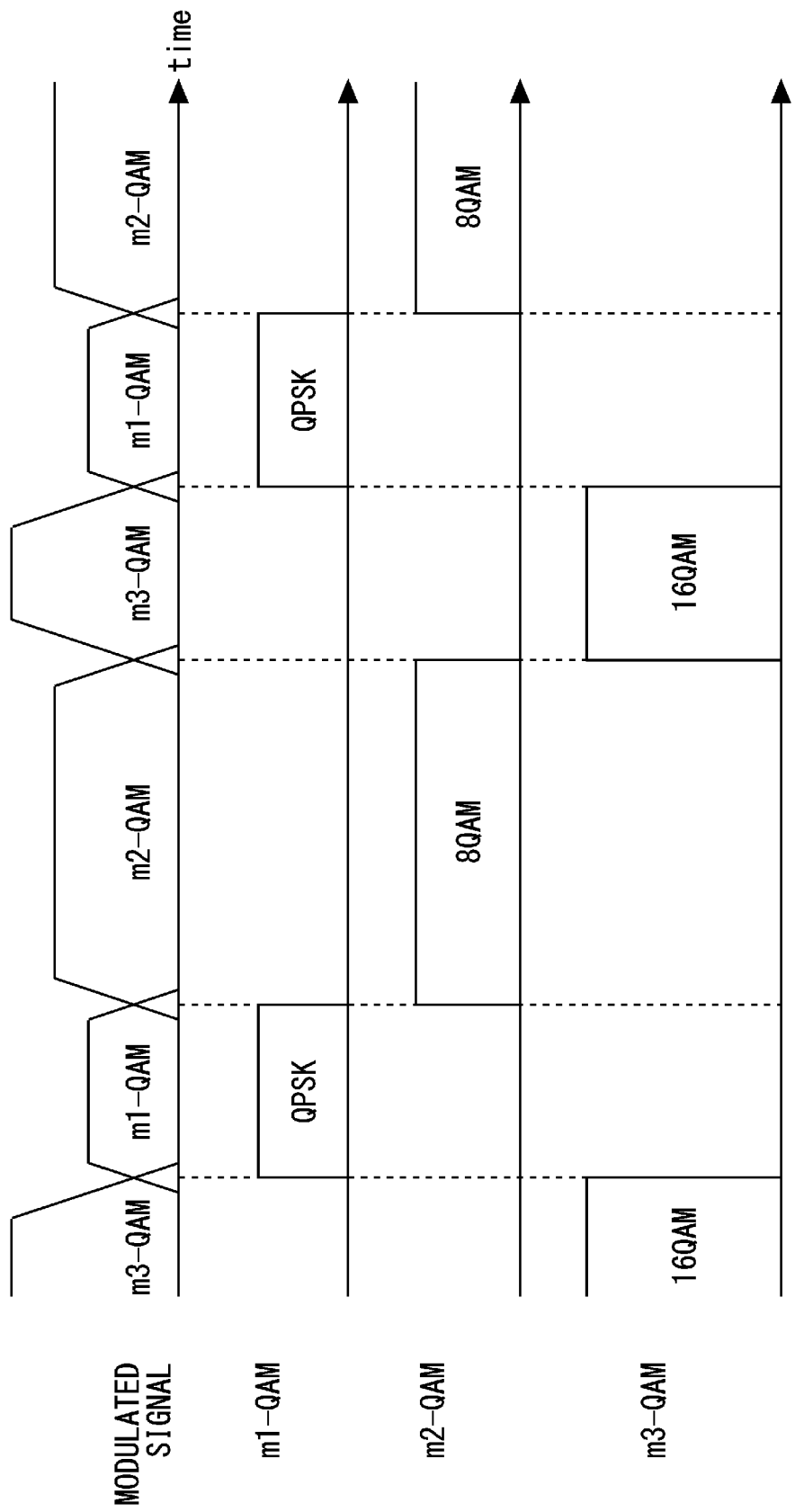
FIG. 6 is a timing chart showing an example of a transmitting operation performed by a communication apparatus according to a third example embodiment of the present disclosure.
Figure 12:
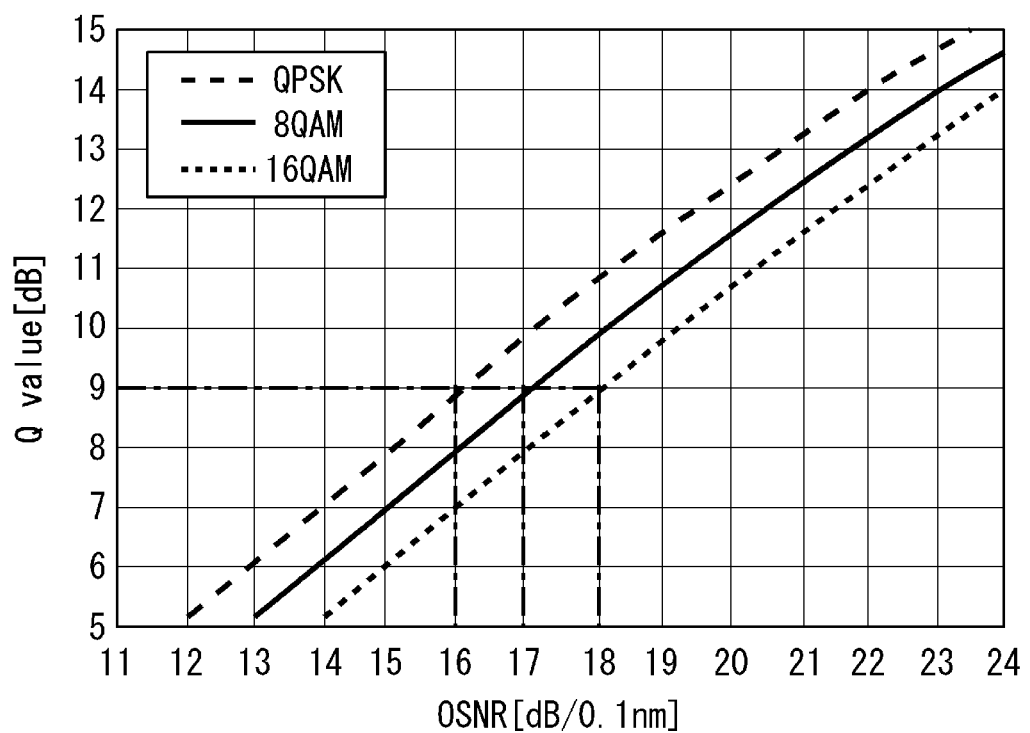
FIG. 12 is a graph showing signal receiving characteristics according to the third example embodiment of the present disclosure.

As second means for making the transmission performances for various modulated signals substantially equal to each other, there is a method for changing the reception OSNR for each modulated signal (i.e., according to the modulated signal). As shown in FIG. 6, it is possible to change the reception OSNR for each modulated signal by changing the amplitude of the output of the drive unit 103 according to the modulated signal and thereby changing the optical power of the modulated signal light output from the optical modulation unit 104. For example, assume that, by using the 8QAM signal as a reference (100%), the amplitude of the QPSK signal is adjusted to 80% and the amplitude of the 16QAM signal is adjusted to 120%. In this case, as shown in FIG. 12, regarding the QPSK signals, 8QAM signals, and 16QAM signals, when the reception OSNR of the modulated signals of the 8QAM signals is 17 dB/0.1 nm, those of the QPSK signals and 16QAM signals can be changed to 16 dB/0.1 nm and 18 dB/0.1 nm, respectively. Therefore, it is possible to make the reception Q-values of the three types of modulated signals substantially equal to each other, i.e., to adjust all of them to 9 dB, under the above-described receiving condition.

Further, the according to this example embodiment, the reception Q-value does not depend on the transmission speed (or the transmission rate), and also does not depend on the type of modulation scheme such as BPSK and 64QAM in addition to the QPSK, 8QAM and 16QAM. Regarding the FEC coding scheme, in addition to the LDPC code, other coding schemes such as the Reed-Solomon code, the BCH code, and the Turbo code may also be used.

According to the communication apparatus 1 in accordance with this example embodiment, it is possible to change the amplitude for each quadrature amplitude-modulated signal to be transmitted, and to make the reception performances of various modulated signals substantially equal to each other.

Other Example Embodiment

In the above-described example embodiment, the present disclosure has been described as the configuration of the communication apparatus 1. However, an embodiment in which a communication system is used instead of the communication apparatus 1 may be adopted. That is, regarding the communication system, it is possible to adopt such a configuration that a transmitter performs the processing performed by the transmitting unit 10 in the second example embodiment; a receiver performs the processing performed by the receiving unit 20; and a controller performs the processing performed by the control unit 30.

Further, although the present disclosure has been described as a hardware configuration in the above example embodiment, the present disclosure is not limited to this example. The communication apparatus 1 according to the present disclosure includes, for example, an example embodiment as a communication method. That is, the communication method includes means for adding an error correction code to a quadrature amplitude-modulated signal, means for changing the number of bits of the error correction code according to a type of the quadrature amplitude-modulated signal, and means for transmitting a plurality of types of quadrature amplitude-modulated signals.

Further, according to the present disclosure, it is also possible to implement the processing in the control unit 4 by having a CPU (Central Processing Unit) execute a computer program.

In the above-described examples, the program may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), CD-R, CD-R/W, and a semiconductor memory (such as a mask ROM, a PROM (Programmable ROM), an EPROM (Erasable PROM), a flash ROM, and a RAM (Random Access Memory)). Further, the programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

The above-described program is a communication program for causing an information processing apparatus to perform a process for adding an error correction code to a quadrature amplitude-modulated signal, a process for changing the number of bits of the error correction code according to a type of the quadrature amplitude-modulated signal; and a process for transmitting a plurality of types of quadrature amplitude-modulated signals.

Although example embodiments according to the present disclosure have been described above with reference to the drawings, the specific configurations are not limited to those described above, and various design modification can be made thereto within the scope and spirit of the present disclosure.

This application is based upon and claims the benefit of priority from Japanese patent application No. 2020-138482, filed on Aug. 19, 2020, the disclosure of which is incorporated herein in its entirety by reference.

REFERENCE SIGNS LIST

1 COMMUNICATION APPARATUS
2, 10 TRANSMITTING UNIT
3 ADDITION UNIT
4, 30 CONTROL UNIT
20 RECEIVING UNIT
101 TRANSMISSION SIGNAL PROCESSING UNIT
102 DIGITAL ANALOG CONVERSION UNIT
103 DRIVE UNIT
104 OPTICAL MODULATION UNIT
105 LIGHT SOURCE UNIT
201 LOCALLY-OSCILLATED LIGHT GENERATION UNIT
202 90-DEGREE OPTICAL HYBRID UNIT
203 PHOTOELECTRIC CONVERSION UNIT
204 ANALOG DIGITAL CONVERSION UNIT
205 RECEPTION SIGNAL PROCESSING UNIT

The invention claimed is:

1. A communication apparatus comprising:
at least one memory storing instructions; and
at least one processor configured to execute the instructions to:
transmit a plurality of types of quadrature amplitude-modulated signals;
add error correction codes to the quadrature amplitude-modulated signals; and
change the number of bits of the error correction code according to the type of the quadrature amplitude-modulated signal, and
change the number of bits of the error correction code in such a way that margins in regard to performance from the reception Q-value as transmission quality at an OSNR condition of each of the quadrature amplitude-modulated signals to a FEC correction limit are substantially equal to each other, wherein the FEC correction limit is a maximum value of a bit error rate before FEC coding, and wherein the maximum value satisfies the requirement that the Q value≥17 dB after the FEC coding.

2. The communication apparatus according to claim 1, wherein the at least one processor is configured to execute the instructions to change an amplitude of each of the quadrature amplitude-modulated signals to be transmitted.

3. The communication apparatus according to claim 1, wherein the quadrature amplitude-modulated signals are transmitted by a time-division multiplexing scheme.

4. The communication apparatus according to claim 3, wherein the at least one processor is configured to execute the instructions to change, when a time-division multiplexing process is performed on a plurality of types of quadrature amplitude-modulated signals, allocation of the quadrature amplitude-modulated signals on a time axis according to the type thereof.

5. The communication apparatus according to claim 1, configured to transmit/receive an optical signal.

6. A communication system comprising:
a transmitter capable of transmitting a plurality of types of quadrature amplitude-modulated signals and adding error correction codes to the quadrature amplitude-modulated signals;
a receiver configured to demodulate the received quadrature amplitude-modulated signals; and
a controller;
where in the controller comprises;
at least one memory storing instructions; and
at least one processor configured to execute the instructions to:
change, for each of the quadrature amplitude-modulated signals to be transmitted, the number of bits of the error correction code to be added thereto, and
change the number of bits of the error correction code in such a way that margins in regard to performance from the reception Q-value as transmission quality at an OSNR condition of each of the quadrature amplitude-modulated signals to a FEC correction limit are substantially equal to each other,
wherein the FEC correction limit is a maximum value of a bit error rate before FEC coding, and
wherein the maximum value satisfies the requirement that the Q value≥17 dB after the FEC coding.

7. The communication system according to claim 6, wherein the at least one processor is configured to execute the instructions to change an amplitude of each of the quadrature amplitude-modulated signals to be transmitted.

8. A communication method comprising:
adding an error correction code to a quadrature amplitude-modulated signal;
changing the number of bits of the error correction code according to a type of the quadrature amplitude-modulated signal; and
transmitting a plurality of types of quadrature amplitude-modulated signals, and
change the number of bits of the error correction code in such a way that margins in regard to performance from the reception Q-value as transmission quality at an OSNR condition of each of the quadrature amplitude-modulated signals to a FEC correction limit are substantially equal to each other,
wherein the FEC correction limit is a maximum value of a bit error rate before FEC coding, and
wherein the maximum value satisfies the requirement that the Q value≥17 dB after the FEC coding.

* * * * *